United States Patent [19]

Wuhrmann et al.

[11] 3,920,854

[45] Nov. 18, 1975

[54] PROCESS FOR PREPARING A COLORED POWDERED EDIBLE COMPOSITION

[75] Inventors: Jean-Jacques Wuhrmann, Saint-Legier; Bernard Venries, Orbe; Raymond Buri, Vevey, all of Switzerland

[73] Assignee: Societe d'Assistance Technique Pour Produits Nestle S.A., Lausanne, Switzerland

[22] Filed: Mar. 5, 1973

[21] Appl. No.: 338,239

[30] Foreign Application Priority Data

Mar. 14, 1972 Switzerland.......................... 3686/72

[52] U.S. Cl................................... 426/250; 426/590
[51] Int. Cl.² ........................................ A23L 1/275
[58] Field of Search .......... 426/285, 147, 177, 250, 426/190, 191, 366, 221, 222, 540, 590

[56] References Cited
UNITED STATES PATENTS

| | | | |
|---|---|---|---|
| 2,868,646 | 1/1959 | Schapiro | 426/177 X |
| 3,100,909 | 8/1963 | Schapiro | 426/285 X |
| 3,658,552 | 4/1972 | Carlson et al. | 426/177 |
| 3,715,216 | 2/1973 | Wuhrmann et al. | 426/190 X |
| 3,802,915 | 4/1974 | Gupta | 426/177 X |

*Primary Examiner*—Robert L. Lindsay, Jr.
*Assistant Examiner*—Arthur L. Corbin
*Attorney, Agent, or Firm*—Watson, Leavenworth, Kelton & Taggart

[57] ABSTRACT

A coloured powdered edible composition is prepared by heating a powdered blend containing a colouring agent, a crystalline hydrate and optionally other ingredients, to release the water of crystallisation present in the hydrate whereby the colouring is homogeneously developed throughout the blend.

12 Claims, No Drawings

PROCESS FOR PREPARING A COLORED POWDERED EDIBLE COMPOSITION

The present invention is concerned with the preparation of powdered edible compositions having a uniform colouring.

The colouring of edible preparations is frequently effected with the use of fatty vehicles since food colourings are generally fat soluble. However when it is desired to obtain dry powdered edible substances having a homogeneous coloration, this property of food colourings is not always applicable because the powdered substances may have an insufficient fat content. Consequently, powdered compositions such as for example compositions for beverages, puddings or soups are generally not coloured or have a heterogeneous appearance and colouring which detract from the aspect of the product.

The present invention is essentially concerned with a process for preparing a powdered composition whereby a homogeneous colouring may be developed within its body without adversely affecting the properties of the powdered mix. The invention provides a process for preparing a coloured powdered edible composition, in which a powdered blend, comprising a colouring agent and an edible substance comprising a crystalline hydrate, is heated at a temperature sufficiently high to release water of crystallisation from the hydrate until a homogeneous coloration is obtained in the blend, the water of crystallisation present in the hydrate representing at least 0.1% by weight of the blend.

By the expression "edible substance comprising a crystalline hydrate" are meant, in the following specification, edible substances capable of existing in the form of crystalline mono-or polyhydrates which release their water of crystallisation on heating. Examples of preferred substances are glucose and citric acid, which form monohydrates, and salts such as citrates, which form polyhydrates. It has been found experimentally that the amount of water of crystallisation released during heating should be at least equal to a minimum amount sufficient to diffuse throughout the powdered blend, develop the adsorbed colouring agents and agglomerate the smallest particles in the blend. Trials effected with different crystalline hydrates have indicated that, for each hydrate, this minimum amount of water of crystallisation represents 0.1% by weight of the powdered blend.

The temperature at which water of crystallisation is released from the hydrate is related to the type of hydrate used. Thus water of crystallisation present in a monohydrate such as citric acid monohydrate begins to be released at 50°C, but it is preferred to heat this hydrate to a temperature between 65° and 80°C. For other hydrates, the temperature at which water of crystallisation is released may be higher, and is for example 150°C for hydrated sodium citrate, which is a dihydrate. Naturally the heating temperature should be selected to avoid damage to the ingredients of the composition.

Although heating of a blend of crystalline hydrate and colouring agent is sufficient to obtain a coloured product, such a product would have a relatively high moisture content, for example of around 10% when the crystalline hydrate is glucose monohydrate, so that a subsequent drying step is called for. According to the invention, it is generally preferred to employ a blend also comprising an anhydrous component in order to regulate the total moisture content of the blend. This anhydrous component may be provided either by the anhydrous form of the substance used as crystalline hydrate or by any other anhydrous edible crystalloid. In this case the colouring agent may be adsorbed either on both the anhydrous component and hydrate, or only on the anhydrous component, depending on whether the hydrate is initially mixed with the anhydrous component and the colouring agent, or is added to the mixture of colouring agent/anhydrous component after heating.

The substances used as crystalline hydrate and anhydrous crystalloid may be selected having regard to the type of product which is to be prepared. Thus the anhydrous crystalloid may be a sugar or an edible salt and the crystalline hydrate the hydrated form of a sugar such as glucose, of an edible acid such as citric acid or of a salt such as a citrate.

Likewise the powdered final product may comprise various other ingredients contributing to the flavour, aroma and appearance of the powder or of the product prepared with this powder. These ingredients may be added to the powdered mixture before or during heating, or after heating and the development of coloration. However the substances which act as a vehicle for the colouring agent preferably may make up the major proportion of the powdered blend, that is about 70 to 90%, as it is these substances which are essentially responsible for producing the desired coloration and its uniformity.

The composition prepared by the process according to the invention may be a powdered composition adapted to provide, on dispersion in water, beverages such as syrups, lemonades or simulated fruit juices. If a syrup or lemonade composition is desired, a blend may be used comprising, for example, a sugar in anhydrous and in hydrated form, or an anhydrous sugar and a crystalline hydrate such as citric acid monohydrate, a colouring agent and a flavouring or an aromatic extract. In preparing simulated fruit juice compositions, other ingredients may be included, such as edible organic acids, pectin, mineral salts, dehydrated natural fruit juices, and a clouding agent. By "clouding agent" is meant a product adapted to give aqueous solutions the turbid appearance of natural suspensions such as fruit juices or milk. Such an agent may comprise particles of a fat coated with a colloidal substance, for example a water-soluble edible gum. The agent is generally prepared by emulsifying the fat in an aqueous solution of an edible gum, followed by spray-drying of the emulsion to provide a powder which is then combined with the other ingredients of the powdered composition.

The powdered composition may also be a product which on mixing with water and milk provides desserts such as custards. Such a product may for example contain an anhydrous sugar, a crystalline hydrate such as glucose or citric acid monohydrate, or sodium citrate dihydrate, a colouring agent, a flavouring and a thickening agent such as pectin, gelatin or a starchy material, this agent being added to the blend after heating and colour development.

The process according to the invention may also be applied to the preparation of powdered condiments or powdered compositions for preparing soups of bouillons, by heating a powdered blend containing, as anhydrous substance, a crystalline salt such as sodium chloride on which a colouring agent is adsorbed, a crystalline hydrate and a flavouring agent. Such a composition may, of course, contain other ingredients such as thickening agents, vegetable extracts, etc., which may be added to the blend before, during or after heating and colour development.

The process according to the invention may be carried out in different ways. For example, a pre-mix may first be prepared comprising an anhydrous crystalloid such as a sugar or a salt, for example sucrose or sodium chloride, and a colouring agent, any aggregates in these ingredients having previously been subdivided by grinding. The pre-mix is then heated, and a crystalline hydrate is added in an amount such that its water of crystallisation represents at least 0.1%, and preferably 0.5% by weight of the total blend. Depending on the type of product being prepared, other powdered ingredients may then be added, before or after cooling. Sensitive ingredients such as flavourings or aromatic extracts are preferably added after cooling to ambient temperature so as to avoid damage and loss by evaporation.

In particular, if a powdered simulated fruit juice composition is being prepared, ingredients such as pectin, edible acids, sodium carrageenate and clouding agent may be added to a blend comprising sugar crystals on which the colouring agent is adsorbed and developed by the water of crystallisation of a hydrate (the water having been released by heating), and all ingredients mixed together for a few minutes. The blend is then cooled to ambient temperature and the flavouring or aromatic extract added.

Alternatively, a powdered blend may be prepared containing at least one anhydrous crystalloid such as a sugar or a salt, at least one crystalline hydrate, which may be the hydrated form of the crystalloid, and at least one colouring agent, and heated to a temperature sufficiently high to release the water of crystallisation from the hydrate.

The process according to the invention may also be carried out by preparing a powdered blend comprising an anhydrous crystalloid, a colouring agent, a crystalline hydrate and the other ingredients making up the product being prepared. The amount of crystalline hydrate is such that its water of crystallisation represents at least 0.1%, and preferably 0.5% by weight of the total blend, which implies that in this case where all the ingredients are blended together at the beginning, the amount of hydrate to be used is greater, in absolute terms, than when the blend is prepared only from the colouring, hydrate and crystalloid. The blend is heated to a temperature sufficiently high to release the water of crystallisation from the hydrate, until a homogeneous colouring is obtained, that is for one or a few minutes depending on the composition and desirably for a period of time not exceeding about 5 minutes. Flavourings or aromatic extracts may be added, if desired, after colouring and cooling of the blend.

The invention is illustrated by the following examples, in which the percentages are expressed on a weight basis.

In the examples the colouring agents are identified by their designation in the "Food, Drug and Cosmetic Act" ("FD&C") classification.

EXAMPLE 1

A powdered simulated orange juice composition is prepared, containing the following ingredients:

| 1. | Crystalline sucrose | 86.8 | % |
|----|---|---|---|
| 2. | Orange colouring "FD&C" No. 5 | 0.016 | % |
| 3. | Yellow colouring "FD&C" No. 6 | 0.004 | % |
| 4. | Crystalline citric acid, as monohydrate | 7.7 | % |
| 5. | Pectin | 0.73 | % |
| 6. | Ascorbic acid | 0.46 | % |
| 7. | Sodium carrageenate | 0.40 | % |
| 8. | Clouding agent | 3.15 | % |
| 9. | Tricalcium phosphate | 0.38 | % |
| 10. | Orange flavour. ("Tetrarome Orange" 100%, produced by Firmenich, Geneva, Switzerland) | 0.36 | % |

Ingredients 4, 5, 6, 7 and 8 are mixed and ground to subdivide aggregates in the blend.

Ingredients 1, 2 and 3 are mixed, aggregates are broken up and heated at 70°C. Ingredients 4 to 8 are added to the hot blend, mixed for 2 minutes at 70°C and cooled to 30°C. After cooling, ingredients 9 and 10 are added and the composition mixed for 2 minutes.

The resulting product is a homogeneously coloured powder of regular particle size, and on dispersion in water provides a beverage having the flavour, appearance and texture of natural orange juice.

EXAMPLE 2

A powdered simulated orange juice composition is prepared, containing the following ingredients:

| 1. | Sucrose | 79.8 | % |
|----|---|---|---|
| 2. | Orange colouring "FD&C" No. 5 | 0.0148 | % |
| 3. | Yellow colouring "FD&C" No. 6 | 0.0052 | % |
| 4. | Crystalline citric acid, as monohydrate | 4.6 | % |
| 5. | Anhydrous citric acid | 2.7 | % |
| 6. | Pectin | 0.66 | % |
| 7. | Ascorbic acid | 0.43 | % |
| 8. | Sodium carrageenate | 0.38 | % |
| 9. | Clouding agent | 2.80 | % |
| 10. | Dehydrated natural orange juice | 7.90 | % |
| 11. | Tricalcium phosphate | 0.35 | % |
| 12. | Orange flavour ("Tetrarome Orange" 100%, produced by Firmenich, Geneva, Switzerland) | 0.36 | % |

Ingredients 1, 2 and 3 are mixed, aggregates subdivided, and heated to 70°C. Ingredient 4 is added to the hot blend and ingredients 1 to 4 are mixed for 2 minutes at 70°C. A powdered composition consisting of ingredients 5, 6, 7, 8, 9 and 10 is then added, the mixture is blended for 2 minutes at 70°C and the resulting product cooled to 30°C. After cooling ingredients 11 and 12 are added to this composition and the mixture blended for 2 minutes.

EXAMPLE 3

A powdered condiment containing the following ingredients is prepared:

| 1. | Sodium chloride | 66.6 | % |
|----|---|---|---|
| 2. | Vegetable fat | 3.0 | % |
| 3. | Wheat flour | 2.8 | % |
| 4. | Sodium glutamate | 17.5 | % |
| 5. | Spice blend | 0.5 | % |
| 6. | Yellow colouring "FD&C" type 5-6 | 0.2 | % |
| 7. | Glucose monohydrate | 9.4 | % |

Ingredients 1 to 6 are blended, the mixture is ground to break up aggregates and heated to 80°C. Glucose monohydrate is then added to the hot mixture, and the ingredients blended for 1 minute at 80°C. A bright yellow powdered product having a regular particle size is obtained.

We claim:

1. A process for preparing a coloured powdered edible composition, consisting essentially of heating a powdered blend comprising a colouring agent and an edible substance comprising a crystalline hydrate to a temperature sufficiently high to release water of crystallisation from the hydrate the released water of crystallization diffusing throughout said blend to effect homogeneous coloration of said blend, the water of crystallisation present in the hydrate representing at least 0.1% by weight of the blend.

2. A process according to claim 1, in which the edible substance is a sugar or an acid or a salt thereof.

3. A process according to claim 1, in which the edible substance is glucose, citric acid or a citrate.

4. A process according to claim 1, in which the crystalline hydrate is heated to a temperature of 65° to 80°C.

5. A process according to claim 1, in which the blend contains an edible anhydrous crystalloid.

6. A process according to claim 5, in which the crystalloid is a sugar or a salt.

7. A process according to claim 6, in which the crystalloid is sucrose or sodium chloride.

8. A process according to claim 1, in which the blend contains at least one ingredient selected from the group consisting of a clouding agent, pectin, ascorbic acid, sodium carrageenate, a fat, a starchy material, a flavouring and an aromatic extract, the total weight of said ingredients representing not more than 30% by weight of the blend.

9. A process according to claim 1, in which the blend is heated for a period of time not exceeding about 5 minutes.

10. A process according to claim 5, in which the crystalline hydrate is heated to a temperature of 65° to 80°C.

11. A process according to claim 10, in which the blend is heated for a period of time not exceeding about 5 minutes.

12. A process according to claim 10, in which the blend contains at least one ingredient selected from the group consisting of a clouding agent, pectin, ascorbic acid, sodium carrageenate, a fat, a starchy material, a flavouring and an aromatic extract, the total weight of said ingredients representing not more than 30% by weight of the blend.

* * * * *